Patented Jan. 26, 1943

2,309,173

UNITED STATES PATENT OFFICE 2,309,173

BLACK CERAMIC PIGMENTS AND METHOD OF PREPARATION

Heinrich Diehl, Frankfort-on-the-Main, Germany; vested in the Alien Property Custodian No Drawing. Application January 11, 1940, Serial No. 313,412. In Germany January 21, 1939

7 Claims. (Cl. 106—302)

This invention relates to certain improved black ceramic pigments and to a method by which those pigments may be prepared. My improved black ceramic pigments are especially useful for coloring enamels and glazes, but they are also useful for various other ceramic purposes such as for underglaze colors, paste colors, and similar applications. The improved pigments impart a deep black color to vitreous glazes and enamels when incorporated in the frit compositions prior to firing by mill addition in amounts ranging from 3 to 5% of the total composition.

My improved pigments are essentially of the copper-chrome type prepared by calcination of a dry mixture of copper oxide and chromium oxide or compounds yielding these oxides when heated. I have found that when certain addition agents or mineralizers are present, in addition to the copper oxide and chromium oxide, and the mixture is calcined at the usual temperatures, ordinarily between 800 and 1100° C. and usually between 850 and 950° C., the black pigments obtained are superior in many respects to the ordinary copper-chrome black pigments now known in the art. It is sometimes desirable to have zinc oxide or cadmium oxide, or compounds yielding these oxides during the calcination, present in the mixture subjected to calcination. Frequently the addition of a small amount of phosphoric acid or of a compound or compounds yielding phosphoric pentoxide under the conditions of the calcination, for example ammonium phosphate, is desirable.

As mineralizers or addition agents added to the copper oxide-chromium oxide mixture before calcination, I have found compounds wherein the metallic element possesses different valences, for example compounds of molybdenum, tungsten and vanadium especially effective. Compounds of iron, nickel, cobalt and manganese, either alone or in combinations of two or more, are also valuable addition agents or mineralizers, but they are not generally as effective as compounds of molybdenum, tungsten and vanadium.

I therefore prefer to use as addition agents or mineralizers, added to the mixture of copper oxide and chromium oxide or compounds yielding these oxides before calcination, the higher oxides of the elements of the 5th and 6th groups of the periodic table, especially earth acids. By higher oxides are meant those in which the metal possesses a higher or its maximum valence. Among addition agents or mineralizers giving very satisfactory results when added as a mill addition to the basic copper-chrome mixture before calcination, are the anhydrides or molybdic acid and tungstic acid, vanadium pentoxide, and salts of the metals molybdenum, tungsten and vanadium which yield the metal oxide during calcination.

The percentage of these addition agents or mineralizers added to the mixture of copper oxide and chromium oxide must generally be such as not to introduce over 15% of the added or formed metal oxide into the total composition. Percentages ranging from 3% to 5% of the oxide of the metal compound added, this amount being based on the total weight of the pigment, may be advantageously employed. Mixtures of one or more of the specified addition agents or mineralizers may also be utilized. Ordinarily the addition agent, in the finely powdered, dry state, should be milled with the oxides of copper and chromium. However, the mineralizers or addition agents may be dissolved in a little water, together with a mixture of the oxides of copper and chromium, thorough admixture of the constituents being secured in this way.

In addition to the mineralizers or addition agents mentioned, there may also be utilized other diluting substances or color intensifying materials. There may be added to the basic copper oxide-chrome oxide composition before heating oxides such as cobalt oxide, nickel oxide, iron oxide, manganese oxide, and uranium oxide, these oxides being introduced in the dry, finely powdered condition. If these metal oxides are present, ordinarily further addition agents such as the mineralizers above specified are not necessary, since the oxides of cobalt, iron, manganese, uranium, etc. are to be considered as mineralizers suitable for use in accordance with this invention.

The presence of the mineralizers or addition agents described in copper oxide-chrome oxide black ceramic pigments will produce, upon calcination, a black ceramic pigment having increased coloring power. Such an increase in coloring power must be regarded as surprising, since ordinarily in ceramic pigments it has been observed that an increase in the crystal growth such as would be promoted by the presence of mineralizers brings about a corresponding decrease in the intensity of the color.

As examples of my improved black ceramic pigments of superior color intensity, and the method by which those pigments may be prepared, the following may be given:

Example I

Copper oxide in the amount of 16 grams and chromium oxide in the amount of 30 grams were thoroughly mixed in the dry, finely powdered state to secure a uniform mixture. To this mixture of oxides there was added 2 grams of tungsten trioxide, $WO_3$. The tungsten trioxide was dispersed throughout the mixture thoroughly by thorough mixing. The mixture of oxides was then calcined at a temperature of about 900° C.

The resulting product was a black ceramic pigment of superior color intensity, which pigment is very effective in the coloring of enamels and glazes. When utilized for coloring glazes or enamels, ordinarily from 3 to 5% of the pigment is added as mill addition to the basic enamel or frit composition.

Example II

In place of tungsten trioxide, added to the basic copper oxide-chromium oxide mixture in Example I, there was added to that mixture 2 grams of ammonium molybdate. The mixture was then calcined at approximately 900° C. and a black ceramic pigment of superior coloring properties and intensity was obtained.

Example III

In place of tungsten trioxide added to the copper oxide-chromium oxide mixture in Example I, there was added to that mixture vanadium pentoxide in the amount of 2 grams. The vanadium pentoxide was thoroughly dispersed throughout the mixture. Upon calcination at approximately 900° C., a black ceramic pigment of superior coloring properties was secured.

Example IV

In place of the 2 grams of tungsten trioxide of Example I, there was added 2 grams of each of the following mixtures to the product obtained by mixing 16 grams of copper oxide and 30 grams of chromium oxide:

A. A mixture of ammonium molybdate and vanadium pentoxide.
B. A mixture of tungsten trioxide and ammonium molybdate.
C. A mixture of tungsten trioxide and vanadium pentoxide.

In all cases, upon calcination of the mixture at 900° C., a black ceramic pigment suitable for coloring enamels and glazes was secured. This black pigment was of an excellent deep black shade and had coloring power and intensity superior to the copper-chrome black ceramic pigments now known to the art.

It is evident that changes may be made in my improved ceramic pigments, as disclosed, which changes would nevertheless come within the principles herein set forth and would not constitute a departure from the spirit and purposes of my invention. For example, these ceramic pigments might be employed for imparting colors other than black (such, for example, as grey) to the vitreous compositions in which they are incorporated. It is therefore my intention to include within the scope of the claims the use of the improved pigments for obtaining colors other than black.

In the appended claims wherever reference is made to an oxide, or to a metal oxide, it is of course my intention to include within the scope of that term salts and compounds which yield that oxide or metal oxide during the heating or calcination.

Since various changes might be made in the invention as disclosed, the foregoing description should be regarded as illustrative of the invention and not limiting, except insofar as may be necessitated by the prior art and appended claims.

I claim:

1. A process for preparing an improved ceramic pigment which comprises heating, to a temperature within the range 800 to 1100° C., a mixture of copper oxide, chromium oxide, and a mineralizing agent selected from the group which consists of compounds of molybdenum, tungsten, vanadium, uranium, iron, nickel, cobalt, and manganese, said metal compounds being capable of yielding the corresponding metal oxides during said heating.

2. An improved black ceramic pigment which comprises the calcination product of a mixture of copper oxide, chromium oxide, and a metal oxide mineralizer selected from the group which consists of the oxides of iron, nickel, cobalt, manganese, molybdenum, tungsten, vanadium, and uranium.

3. An improved black ceramic pigment which comprises the calcination product of a mixture of copper oxide, chromium oxide, a metal oxide-yielding compound selected from the compounds of the metals of the group which consists of iron, nickel, cobalt, manganese, molybdenum, tungsten, vanadium, and uranium, yielding the corresponding metal oxides during the calcination, and a metal oxide selected from the group which consists of zinc oxide and cadmium oxide.

4. An improved black ceramic pigment which comprises the calcination product of a mixture of copper oxide, chromium oxide, and a compound of tungsten yielding the oxide during the calcination.

5. An improved black ceramic pigment which comprises the calcination product of a mixture of copper oxide, chromium oxide, and a compound of molybdenum yielding the oxide during the calcination.

6. An improved black ceramic pigment which comprises the calcination product of a mixture of copper oxide, chromium oxide, and a compound of vanadium yielding the oxide during the calcination.

7. A process for preparing an improved black ceramic pigment which comprises heating, to a temperature within the range 800–1100° C., a mixture of copper oxide; chromium oxide; a mineralizing agent selected from the group which consists of compounds of molybdenum, tungsten, vanadium, uranium, iron, nickel, cobalt, and manganese, said metal compounds being capable of yielding the corresponding metal oxides during said heating; and a compound selected from the group which consists of compounds of zinc and cadmium yielding the corresponding metal oxides during said heating.

HEINRICH DIEHL.